United States Patent
Oya

(10) Patent No.: US 10,791,243 B2
(45) Date of Patent: Sep. 29, 2020

(54) IMAGE FORMING APPARATUS, CONTROL METHOD, AND STORAGE MEDIUM

(71) Applicant: CANON KABUSHIKI KAISHA, Tokyo (JP)

(72) Inventor: Hiroshi Oya, Tokyo (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 16/189,987

(22) Filed: Nov. 13, 2018

(65) Prior Publication Data

US 2019/0158699 A1    May 23, 2019

(30) Foreign Application Priority Data

Nov. 20, 2017 (JP) .................. 2017-222689

(51) Int. Cl.
| | |
|---|---|
| *H04N 1/34* | (2006.01) |
| *G06F 3/12* | (2006.01) |
| *H04N 1/00* | (2006.01) |
| *G03G 21/02* | (2006.01) |

(52) U.S. Cl.
CPC .............. *H04N 1/34* (2013.01); *G03G 21/02* (2013.01); *H04N 1/00474* (2013.01)

(58) Field of Classification Search
CPC ...... H04N 1/34; H04N 1/00474; G03G 21/02; G06F 3/1273
See application file for complete search history.

(56) References Cited

U.S. PATENT DOCUMENTS

| | | | | |
|---|---|---|---|---|
| 2009/0244586 A1* | 10/2009 | Sei | ......... | G03G 21/02 358/1.13 |
| 2009/0273805 A1* | 11/2009 | Nakagawa | ............. | G06Q 10/06 358/1.15 |
| 2011/0170139 A1* | 7/2011 | Shozaki | ................. | G03G 21/02 358/1.15 |
| 2014/0368854 A1* | 12/2014 | Iwadate | ............... | G06K 15/027 358/1.13 |

FOREIGN PATENT DOCUMENTS

JP     2007-094084 A     4/2007

* cited by examiner

*Primary Examiner* — Kent Yip
(74) *Attorney, Agent, or Firm* — Canon U.S.A., Inc. IP Division

(57) ABSTRACT

An image forming apparatus includes a setting unit that sets a non-billing mode that is a mode of executing, without performing billing, a job that is set such that billing is performed for execution of the job, and a storage unit that stores a history of a job executed during a period in which the non-billing mode is set, wherein the stored history includes a cumulative number of pages obtained by printing performed by executing a job during a period in which the non billing mode is set.

19 Claims, 11 Drawing Sheets

FIG.5

| JOB TYPE | COUNTER TYPE | CUMULATIVE PAGE COUNTER | |
|---|---|---|---|
| COPY | COLOR | 100 | 611 |
| | MONOCHROME | 200 | 612 |
| | BILLING | 290 | 613 |
| | NON-BILLING MODE | 10 | 614 |
| | JOB TOTAL | 300 | 615 |
| PRINT | COLOR | 50 | 621 |
| | MONOCHROME | 400 | 622 |
| | BILLING | 445 | 623 |
| | NON-BILLING MODE | 5 | 624 |
| | JOB TOTAL | 450 | 625 |
| FAX | COLOR | 0 | 631 |
| | MONOCHROME | 30 | 632 |
| | BILLING | 30 | 633 |
| | NON-BILLING MODE | 0 | 634 |
| | JOB TOTAL | 30 | 635 |
| REPORT | COLOR | 5 | 641 |
| | MONOCHROME | 15 | 642 |
| | BILLING | 0 | 643 |
| | NON-BILLING MODE | 0 | 644 |
| | JOB TOTAL | 20 | 645 |
| IMAGE QUALITY ADJUSTMENT PRINT | COLOR | 15 | 651 |
| | MONOCHROME | 0 | 652 |
| | BILLING | 0 | 653 |
| | NON-BILLING MODE | 0 | 654 |
| | JOB TOTAL | 15 | 655 |
| TOTAL | COLOR | 170 | 661 |
| | MONOCHROME | 645 | 662 |
| | BILLING | 765 | 663 |
| | NON-BILLING MODE | 15 | 664 |
| | JOB TOTAL | 815 | 665 |

FIG.7

| HISTORY NO. | NON-BILLING MODE ON DATE AND TIME | NON-BILLING MODE OFF DATE AND TIME | NUMBER OF PAGES PRINTED WITH NON-BILLING DURING NON-BILLING MODE | CUMULATIVE NUMBER OF PAGES PRINTED WITH NON-BILLING |
|---|---|---|---|---|
| 1 | 2017/1/1 10:00 | 2017/1/1 10:15 | 30 | 30 |
| 2 | 2017/3/3 11:00 | 2017/3/3 12:33 | 150 | 180 |
| 3 | 2017/3/10 14:52 | 2017/3/10 14:59 | 20 | 200 |
| 4 | 2017/3/14 13:01 | 2017/3/14 13:04 | 10 | 210 |
| 5 | 2017/4/1 10:00 | 2017/4/1 11:00 | 300 | 510 |

FIG.8

| | HISTORY NO. | NON-BILLING MODE ON DATE AND TIME | NON-BILLING MODE OFF DATE AND TIME | NUMBER OF PAGES PRINTED WITH NON-BILLING DURING NON-BILLING MODE | CUMULATIVE NUMBER OF PAGES PRINTED WITH NON-BILLING |
|---|---|---|---|---|---|
| SERVICE ENGINEER PRINTING 1 | 1 | 2017/1/1 10:00 | 2017/1/1 10:15 | 30 | 30 |
| SERVICE ENGINEER PRINTING 2 | 2 | 2017/3/3 11:00 | 2017/3/3 12:33 | 150 | 180 |
| SUSPICIOUS PRINTING 1 | 3 | 2017/3/10 14:52 | 2017/3/10 14:59 | 20 | 200 |
| SUSPICIOUS PRINTING 2 | 4 | 2017/3/14 13:01 | 2017/3/14 13:04 | 10 | 210 |
| SERVICE ENGINEER PRINTING 3 | 5 | 2017/4/1 10:00 | 2017/4/1 11:00 | 300 | 510 |

1101C

| | HISTORY NO. | NON-BILLING MODE ON DATE AND TIME | NON-BILLING MODE OFF DATE AND TIME | NUMBER OF PAGES PRINTED WITH NON-BILLING DURING NON-BILLING MODE | CUMULATIVE NUMBER OF PAGES PRINTED WITH NON-BILLING |
|---|---|---|---|---|---|
| SUSPICIOUS PRINTING 1 | 1 | 2017/1/1 10:00 | 2017/1/1 10:15 | 30 | 30 |
| SUSPICIOUS PRINTING 2 | 2 | 2017/3/3 11:00 | 2017/3/3 12:33 | 150 | 180 |
| | | | | | |
| | | | | | |

1101A

There is a suspicious history!

REPORT

SERVICE ENGINEER

INCONSISTENT AS A RESULT OF COMPARISON

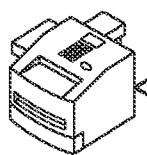

| | HISTORY NO. | NON-BILLING MODE ON DATE AND TIME | NON-BILLING MODE OFF DATE AND TIME | NUMBER OF PAGES PRINTED WITH NON-BILLING DURING NON-BILLING MODE | CUMULATIVE NUMBER OF PAGES PRINTED WITH NON-BILLING |
|---|---|---|---|---|---|
| SERVICE ENGINEER PRINTING 1 | 1 | 2017/1/1 10:00 | 2017/1/1 10:15 | 30 | 30 |
| SERVICE ENGINEER PRINTING 2 | 2 | 2017/3/3 11:00 | 2017/3/3 12:33 | 150 | 180 |
| SUSPICIOUS PRINTING 1 | 3 | 2017/3/10 14:52 | 2017/3/10 14:59 | 20 | 200 |
| SUSPICIOUS PRINTING 2 | 4 | 2017/3/14 13:01 | 2017/3/14 13:04 | 10 | 210 |

| HISTORY NO. 1002 | NON-BILLING MODE ON DATE AND TIME 1003 | NON-BILLING MODE OFF DATE AND TIME 1004 | JOB TYPE 1005 | NUMBER OF PAGES PRINTED WITH NON-BILLING DURING NON-BILLING MODE 1006 | CUMULATIVE NUMBER OF PAGES PRINTED WITH NON-BILLING 1007 |
|---|---|---|---|---|---|
| 1 | 2017/1/1 10:00 | 2017/1/1 10:15 | COPY | 30 | 30 |
| 2 | 2017/3/3 11:00 | 2017/3/3 12:33 | COPY | 100 | 130 |
| 3 | 2017/3/3 11:00 | 2017/3/3 12:33 | PRINT | 50 | 180 |
| 4 | 2017/3/10 14:52 | 2017/3/10 14:59 | PRINT | 20 | 200 |
| 5 | 2017/3/14 13:01 | 2017/3/14 13:04 | PRINT | 10 | 210 |
| 6 | 2017/4/1 10:00 | 2017/4/1 11:00 | PRINT | 100 | 310 |
| 7 | 2017/4/1 10:00 | 2017/4/1 11:00 | COPY | 200 | 510 |

1001

IMAGE FORMING APPARATUS, CONTROL METHOD, AND STORAGE MEDIUM

BACKGROUND

Field

Aspects of the present disclosure generally relate to an image forming apparatus, a control method, and a storage medium.

Description of the Related Art

Some conventional image forming apparatuses having a printing function such as a print or copy function are provided with an operation mode in which a service engineer uses the image forming apparatus. The operation mode that a service engineer makes use of is a mode for performing adjustment of colors that the image forming apparatus outputs or adjustment for resolving abnormalities such as disturbance of an image occurring on a printed product.

After performing adjustment in such a mode, the service engineer performs test printing to confirm whether the image firming apparatus will operate normally. In this test printing, printing is performed with arbitrary image data input to the image forming apparatus from, for example, a personal computer (PC) that the user uses or copying of an arbitrary image is performed. There is a proposal in which, when performing test printing in the above-mentioned manner, the service engineer first causes the image forming apparatus to transition to an operation mode not to perform billing (charging) to the user (hereinafter referred to as a "non-billing mode") and then performs printing.

Japanese Patent Application Laid-Open No. 2007-094084 discusses a technique in which a page count value for billing/non-billing is displayed for every job executed in a maintenance mode (equivalent to the non-billing mode) and the service engineer can change a billing/non-billing counter.

If the service engineer forgets to cancel the non-billing mode or if a method of performing transition to the non-billing mode has been found by a general user, printing that is originally a target for billing can be improperly performed in a non-billing condition. In the absence of the service engineer, it is impossible to recognize how much the user has performed printing that is originally targeted for billing in the condition of the non-billing mode.

SUMMARY

According to an aspect of the present disclosure, an image forming apparatus includes a setting unit configured to set a non-billing mode that is a mode of executing, without performing billing, a job that is set such that billing is performed for execution of the job, and a storage unit configured to store a history of a job executed during a period in which the non-billing mode is set, wherein the stored history includes a cumulative number of pages obtained by printing performed by executing a job during a period in which the non-billing mode is set.

Further features will become apparent from the following description of exemplary embodiments with reference to the attached drawings.

BRIEF DESCRIPTION OF THE DRAWINGS

FIG. 5 is a diagram illustrating an example of a counter management table in the first exemplary embodiment.

FIG. 7 is a diagram illustrating an example of a non-billing mode usage history in the first exemplary embodiment.

FIG. 8 is a diagram illustrating a scenario example of detection of improper use of the non-billing mode in the first exemplary embodiment.

FIG. 11 is a diagram illustrating an example of a non-billing mode usage history in a second exemplary embodiment.

DESCRIPTION OF THE EMBODIMENTS

Various exemplary embodiments, features, and aspects of the disclosure will be described in detail below with reference to the drawings. However, constituent elements described in these exemplary embodiments are merely illustrated as examples, and are not intended to limit the scope of the present disclosure.

Hereinafter, a first exemplary embodiment is described.
<System Configuration>

Figure 1:
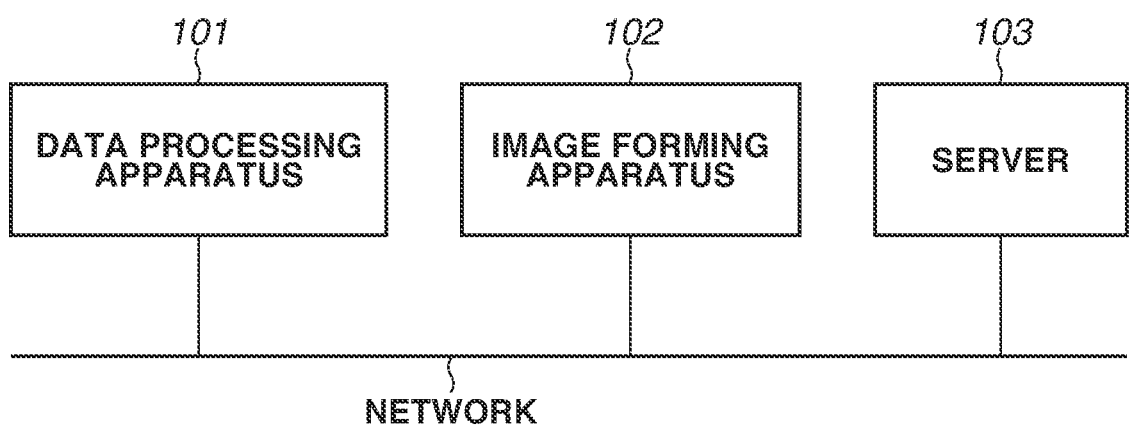
FIG. 1 is a diagram illustrating an outline configuration of a system according to an exemplary embodiment.

FIG. 1 is a diagram illustrating the outline of an entire configuration of a system including an image forming apparatus 102 according to the first exemplary embodiment.

As illustrated in FIG. 1, the system includes, in addition to the image forming apparatus 102, a data processing apparatus 101 and a server 103.

The data processing apparatus 101 is, for example, a computer, and functions as a source of supply of image information. The image forming apparatus 102 is described as, for example, a multifunctional peripheral in the following description, but can be, for example, an electrophotographic printer having no scanner function or having no facsimile (FAX) function. The image forming apparatus 102 is connected to data processing apparatus 101 via a network or universal serial bus (USB), but is assumed to be connected via a network in the present exemplary embodiment. The server 103 is, for example, a database server, and is connected to the image forming apparatus 102 via a network. The server 103 collects and stores information, such as various errors or changes in state, detected by the image forming apparatus 102.
<Configuration of Image Forming Apparatus>

Figure 2:
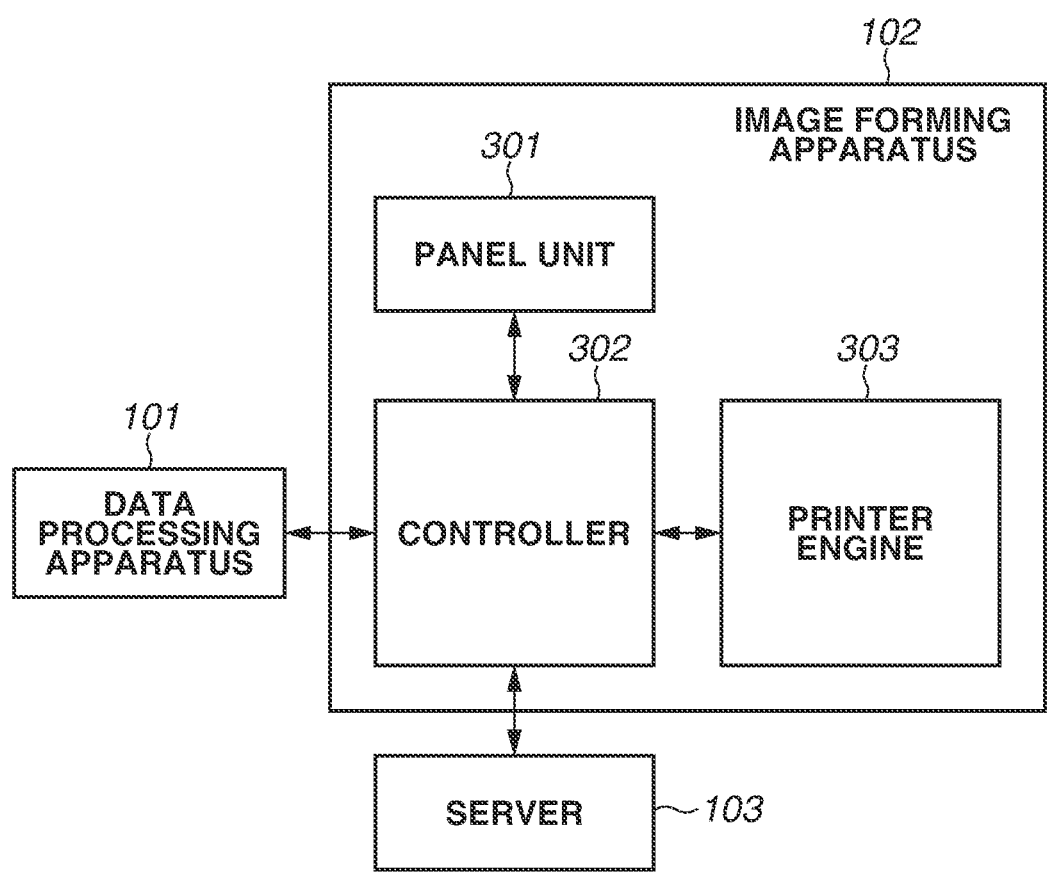
FIG. 2 is a diagram illustrating a schematic configuration of an image forming apparatus according to an exemplary embodiment.

FIG. 2 is a block diagram illustrating a schematic configuration of the image forming apparatus 102 according to the first exemplary embodiment.

A printer controller (hereinafter referred to as a "controller") 302 generates raster data for every page based on image information expressed by, for example, page-description language (PDL), which is supplied from the data processing apparatus 101, and sends out the raster data to a printer engine 303. The printer engine 303 forms a latent image on a photosensitive drum based on the raster data supplied from the controller 302, and then transfers and fixes the latent image onto a recording medium by an electrophotographic method, thus forming an image on the recording medium.

A panel unit 301 is used as a user interface (UI). The controller 302 receives an intended operation instruction from the user via the panel unit 301. The transition to an operation mode that the service engineer uses or the transition to a non-billing mode is performed by performing a specific procedural operation via the panel unit 301. A UI used to perform transition can be displayed on the panel unit 301, and is assumed to be displayed thereon in the present exemplary embodiment.

Figure 3:
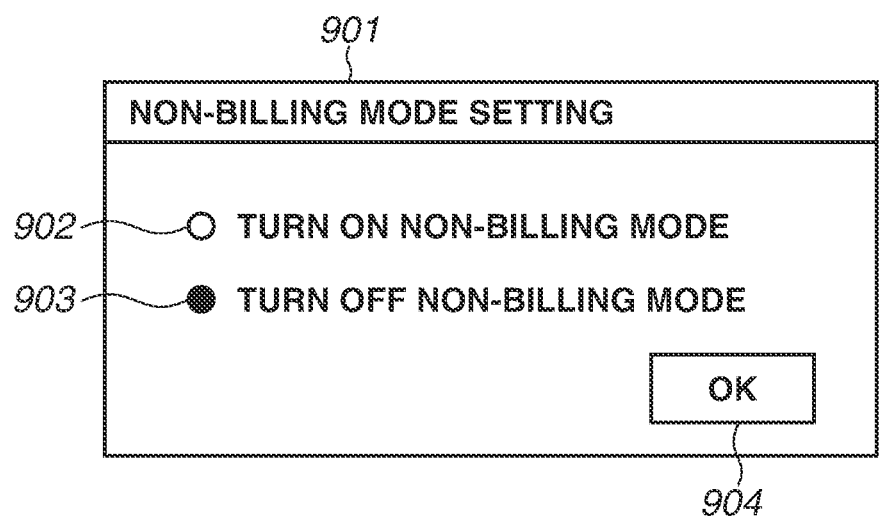
FIG. 3 is a diagram illustrating an example of a user interface (UI) screen used to set a non-billing mode in a first exemplary embodiment.

An example of a UI that is displayed on the panel unit 301 to perform transition to the non-billing mode is illustrated in FIG. 3.

Referring to FIG. 3, a radio button 902 for turning on the non-billing mode, a radio button 903 for turning off the non-billing mode, and an OK button 904 are provided on a non-billing mode setting dialog 901. When the radio button 902 for turning on the non-billing mode is selected and the OK button 904 is pressed, the transition to the non-billing mode is performed. When the radio button 903 for turning off the non-billing mode and the OK button 904 is pressed, the non-billing mode is canceled.

The controller 302 notifies the user of, for example, the status of the image forming apparatus 102 and warnings to the user via the panel unit 301. The status of the image forming apparatus 102 that is displayed on the panel unit 301 includes information indicating that the image forming apparatus 102 is in the non-billing mode.

The controller 302 transmits information such as errors or changes in state of the image forming apparatus 102 to the server 103. The information that is transmitted includes information on change of ON/OFF of the non-billing mode. The service engineer checks information received by the server 103, and can recognize whether the non-billing mode has been turned on or off.

<Configuration of Controller>

Figure 4:
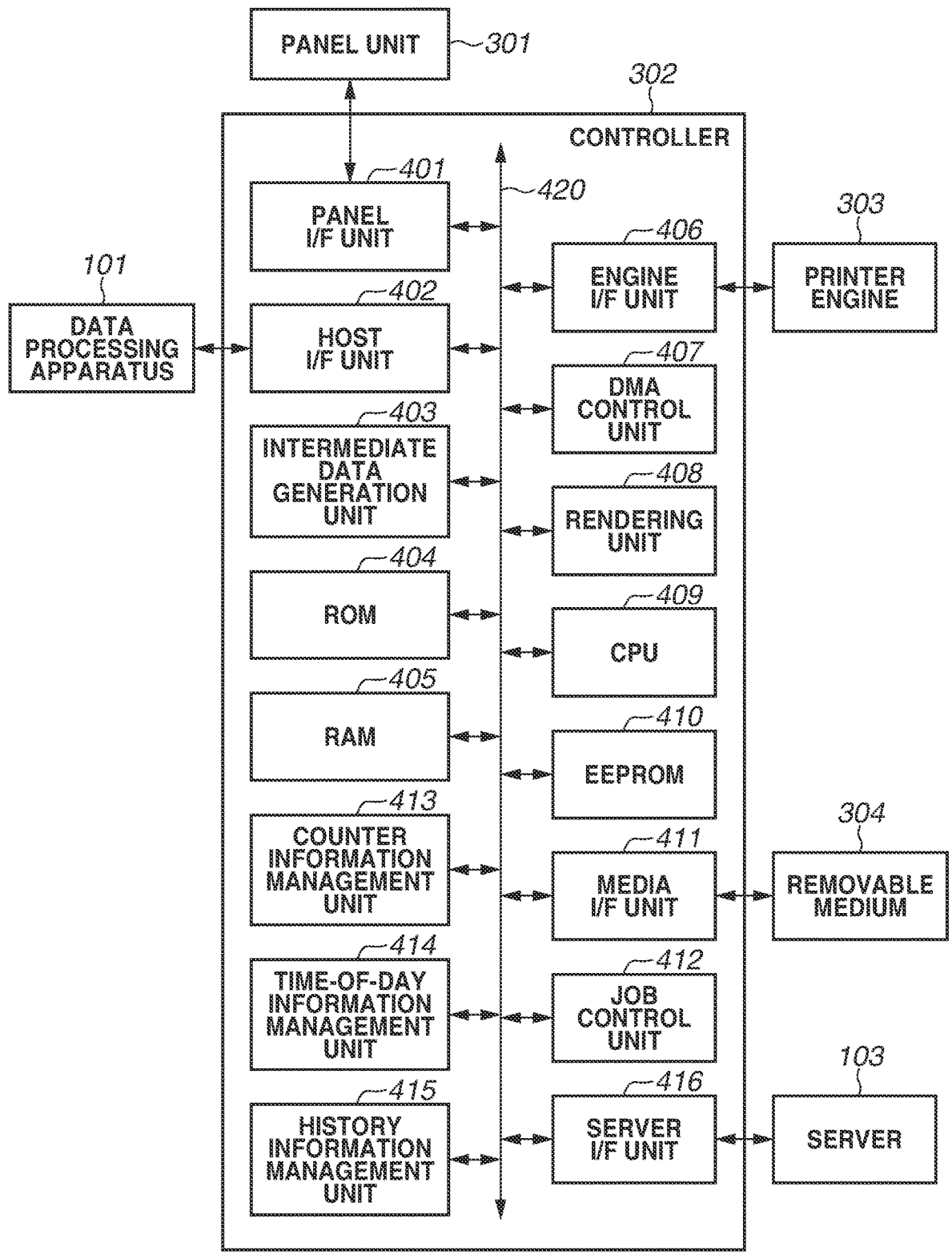
FIG. 4 is a block diagram illustrating a configuration example of a controller included in the image forming apparatus.

FIG. 4 is a block diagram illustrating a configuration example of the controller 302.

Referring to FIG. 4, a panel interface (I/F) unit 401 performs data communication with the panel unit 301. A central processing unit (CPU) 409 receives, via the panel I/F unit 401, settings and instruction contents transmitted from the user via the panel unit 301. A host I/F unit 402 performs bidirectional communication connection with the data processing apparatus 101, such as a host computer, via a network. An intermediate data generation unit 403 performs processing for converting a print job received from the data processing apparatus 101 via the host I/F unit 402 into intermediate data, which is a form that can easily be handled inside the image forming apparatus 102.

A read-only memory (ROM) 404 retains control program code for performing processing described in the present exemplary embodiment and other processing operations that are performed by the image forming apparatus 102. The CPU 409 controls, for example, devices 401 to 411 connected to a CPU bus 420 based on control program code stored in the ROM 404. A random access memory (RAM) 405 stores, for example, print data received via the host I/F unit 402, intermediate data generated by interpreting print data, and bit-mapped data generated by rendering intermediate data. The RAM 405 also stores, for example, temporary statuses, log information, and counters (for example, a job counter described below) required for various processing operations. In a case where the service engineer has operated the panel unit 301 to perform transition to the non-billing mode, information indicating that the image forming apparatus 102 is in the non-billing mode is also stored as billing mode information in the RAM 405. In the present exemplary embodiment, the billing mode information includes information indicating in which of at least two modes, i.e., a normal mode and a non-billing mode, the image forming apparatus 102 is.

An engine I/F unit 406 is a unit used to perform communication connection with the printer engine 303. The CPU 409 recognizes the state of the printer engine 303 via the engine I/F unit 406. The CPU 409 transfers bit-mapped data stored in the RAM 405 to the engine I/F unit 406 via a direct memory access (DMA) control unit 407. A rendering unit 408 performs rasterization to a bit-mapped image according to the content of intermediate data stored in the RAM 405. A non-volatile memory 410 retains setting information about the image forming apparatus 102. The non-volatile memory 410 can be any memory as long as it is a flash memory, and is assumed to be an electrically erasable programmable read-only memory (EEPROM) in the present exemplary embodiment. A media I/F unit 411 reads or writes various pieces of data, such as image data, program data, and device setting data, from or to a removable medium 304, such as a USB memory.

A job control unit 412 is a module for a program stored in the ROM 404, and the program is then stored in the RAM 405 and executed by the CPU 409. The CPU 409 stores, via the job control unit 412, data received from the data processing apparatus 101 as a print job in the RAM 405 and then performs print processing. Moreover, the CPU 409 stores, via the job control unit 412, data received from the data processing apparatus 101 as a print job in the RAM 405, or deletes the stored print job from the RAM 405.

When receiving error information, such as out of toner, from the printer engine 303, the CPU 409 temporarily stops a print job via the job control unit 412 and causes the panel unit 301 to display an error or warning via the panel I/F unit 401. When receiving information indicating resolution of an error from the printer engine 303 or when receiving inputting of a print resumption permission by the user via the panel unit 301, the CPU 409 instructs the job control unit 412 to resume printing.

A counter information management unit 413 is a module for a program stored in the ROM 404, and the program is then stored in the RAM 405 and is executed by the CPU 409. The CPU 409 transmits, to the counter information management unit 413, information about, for example, the type of a job and a printing mode, and timing of start and end of a job via the job control unit 412. The counter information management unit 413 performs addition processing on counters in a counter management table 601 stored in the EEPROM 410 based on the transmitted information.

The counter management table 601, which is illustrated in FIG. 5 as an example, will be described. The counter management table 601 includes job types 602, counter types 603, and cumulative page counters 604. The job types 602 are types of jobs which the image forming apparatus 102 supports, and, in the present exemplary embodiment, the image forming apparatus 102 is assumed to support copy, print, FAX, report, and image quality print. "Total" is not strictly a job type, but is the total (cumulative number of pages) by the cumulative page counter 604 for every counter type of all of the job types that the image forming apparatus 102 supports, thus indicating the total of printing operations performed by the image forming apparatus 102. The counter types 603 are types of counters, and, in the present exemplary embodiment, the image forming apparatus 102 is assumed to support color, monochrome, billing, non-billing mode, and job Total. The cumulative page counters 604 retain a cumulative number of page counters 611 to 665 corresponding to the number of the counter types 603 for the respective job types 602.

The cumulative page counter 604 corresponding to the counter type 603 being "color" performs addition of "1" in a case where the printed page is color. The cumulative page counter 604 corresponding to the counter type 603 being "monochrome" performs addition of "1" in a case where the printed page is monochrome. The cumulative page counter 604 corresponding to the counter type 603 being "billing" performs addition of "1" in a case where the job type of the printed page is a job type for which billing is performed. The determination as to whether the job type of the printed page is a job type for which billing is performed is described below.

The cumulative page counter 604 corresponding to the counter type 603 being "non-billing mode" performs addition of "1" in a case where the image forming apparatus 102 is in the non-billing mode during printing and the job type of the printed page is a job type serving as a target for non-billing during the non-billing mode. The determination as to whether the job type of the printed page is a job type serving as a target for non-billing during the non-billing mode is described below. The cumulative page counter 604 corresponding to the counter type 603 being "job Total" performs addition of "1" in a case where the job type of the printed page is a corresponding job type. For example, in a case where the job type of the printed page is "print", the cumulative page counter 625 corresponding to "job Total" for "print" performs addition of "1".

In some cases, for printing one page, a plurality of cumulative page counters can concurrently perform addition. For example, at the time of printing of a color copy job, in the counter information management unit 413, the cumulative page counter 611 for "color" of the copy job, the cumulative page counter 613 for "billing" of the copy job, and the cumulative page counter 615 for "job Total" of the copy job perform addition. At the same time, in the job type 602 of "Total", cumulative page counters corresponding to the respective same counter types, i.e., the cumulative page counter 661 for "color", the cumulative page counter 663 for "billing", and the cumulative page counter 665 for "job Total" also perform addition.

Figure 6:
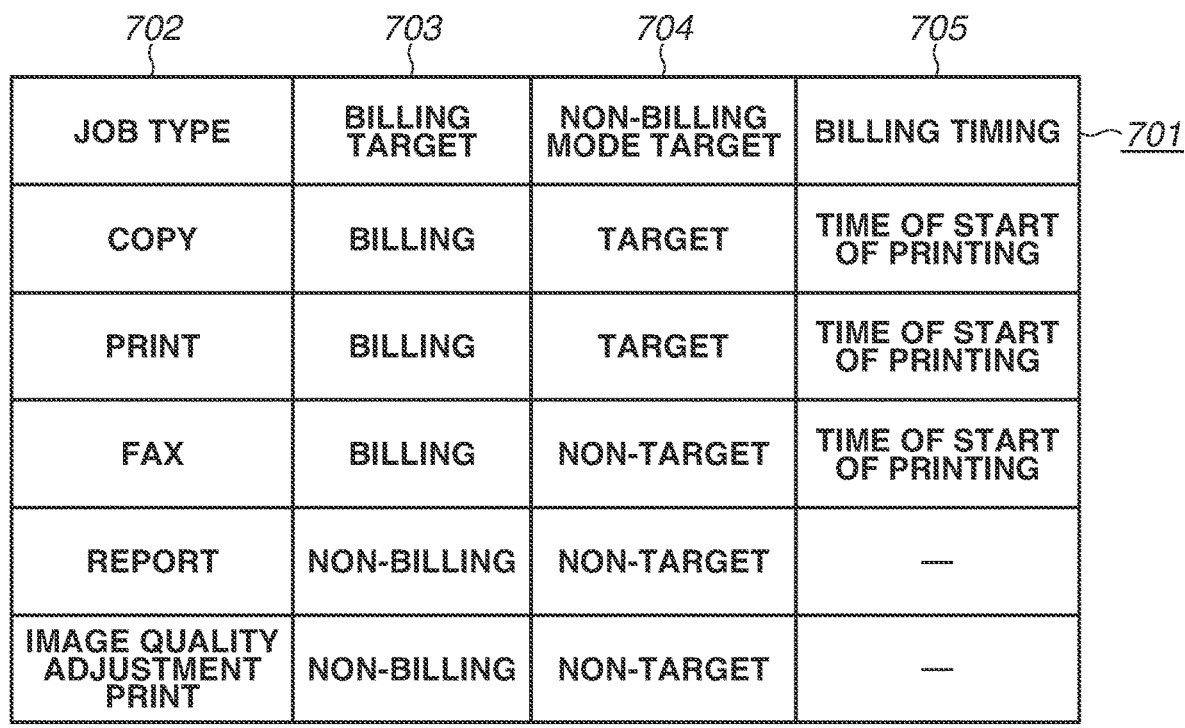
FIG. 6 is a diagram illustrating an example of a billing management table in the first exemplary embodiment.

The method of determining, for example, which job type is a target for billing and at what timing the counter performs addition will be described with reference to FIG. 6. FIG. 6 illustrates a billing management table 701 that is stored in the EEPROM 410, which is a non-volatile memory. Job types 702 are job types that the image forming apparatus 102 supports as with the job types 602, but do not include "Total" because the billing management table 701 is setting information for every job type. Billing target information 703 indicates whether each job type is a target for "billing" or "non-billing".

In the present exemplary embodiment, copy, print, and FAX are target for billing, while report and image quality adjustment print are targets for non-billing. Accordingly, the cumulative page counter 604 corresponding to the counter type 603 being "billing" performs addition in the case of job types the billing target information 703 of which is "billing", i.e., in the case of copy, print, and FAX. In the case of report or image quality adjustment print, the cumulative page counter corresponding to the counter type 603 being "billing", i.e., the cumulative page counter 643 or 653, does not perform addition. Therefore, the cumulative page counters 643 and 653 do not need to be included in the counter management table 601.

Non-billing mode target information 704 indicates whether a job type is a target for non-billing when the image forming apparatus 102 is in the non-billing mode. In the present exemplary embodiment, only copy and print are set as targets for non-billing. In other words, copy and print are originally jobs targeted for billing, but, since the non-billing mode target information 704 is "target", are set as jobs for non-billing when the image forming apparatus 102 is in the non-billing mode. FAX, the non-billing mode target information 704 of which is "non-target", therefore, remains as a target for billing even when the image forming apparatus 102 is in the non-billing mode. Report and image quality adjustment print are originally jobs for non-billing, and, therefore, remain as targets for non-billing even when the image forming apparatus 102 is in the non-billing mode.

The cumulative page counters 604 (614 and 624) corresponding to the counter type 603 being "non-billing mode" perform addition in a case where the job types are copy and print, the non-billing mode target information 704 of which is "target", and printing has been performed with non-billing when the image forming apparatus 102 is in the non-billing mode. Billing timing information 705 indicates timing at which the billing counter performs addition. In the present exemplary embodiment, the timing is set as the time of start of printing, but can be different timing, such as the time of start of paper feeding or the time of completion of printing.

Returning to FIG. 4, the controller 302 includes a time-of-day information management unit 414 that is a module for a program retained in the ROM 404, and the program is then stored in the RAM 405 of the controller 302 and executed by the CPU 409. The time-of-day information management unit 414 calculates and manages current time-of-day information from date and time information set by the user via the panel unit 301 and elapsed time information measured by an operating system (OS) (not illustrated) with the set date and time as a starting point. The OS (not illustrated) acquires current time-of-day information by acquiring time-of-day information from a real-time clock at the time of powering-on of the image forming apparatus 102, and, after that, successively updates current time-of-day information based on elapsed time information measured by the OS (not illustrated). In a case where the image forming apparatus 102 does not include a real-time clock, the OS (not illustrated) can acquire time-of-day information from an external device, such as the data processing apparatus 101, at the time of powering-on of the image forming apparatus 102.

A server I/F unit 416 performs bidirectional communication connection with server 103 via a network. The server I/F unit 416 processes error or state change information detected by the controller 302 and the printer engine 303 into information that can easily be stored and analyzed by the server 103, and transmits the processed information to the server 103. When detecting a change in billing mode information stored in the RAM 405, the CPU 409 notifies the server I/F unit 416 of such a change, and the server I/F unit 416 notifies the server 103 of a change in ON/OFF of the non-billing mode as an alarm. The CPU bus 420 includes address, data, and control buses. The devices 401 to 411 can individually access all of the devices connected to the CPU bus 420.

A history information management unit 415 is a module for a program retained in the ROM 404, and the program is then stored in the RAM 405 of the controller 302 and executed by the CPU 409. The history information management unit 415 stores history information about events, such as an error, which occurred in the image forming apparatus 102. For example, the history information management unit 415 stores, as history information, date and time of occurrence, place of occurrence, and date and time of resolution of paper jam in the EEPROM 410.

In the present exemplary embodiment, the history information management unit 415 is configured to also store a non-billing mode usage history 801. The non-billing mode usage history illustrated in FIG. 7 as an example is described as follows. The non-billing mode usage history 801 to be stored includes, for example, history No. 802, non-billing mode ON date and time 803, non-billing mode OFF date and time 804, number of pages printed with non-billing during non-billing mode 805, and cumulative number of pages printed with non-billing 806.

The history No. 802 of the usage history is a history number of the usage history. The non-billing mode ON date and time 803 is date and time information at which the non-billing mode was turned on, and the non-billing mode OFF date and time 804 is date and time information at which the non-billing mode was turned off. With regard to the non-billing mode ON date and time 803 and the non-billing mode OFF date and time 804, in the present exemplary embodiment, a combination of year, month, day, hour, and minute is recorded, but a combination of up to the second can be recorded. Any method can be employed as long as distinction can be made even when the non-billing mode was used a plurality of times on the same day.

The number of pages printed with non-billing during non-billing mode 805 indicates the number of pages printed with non-billing in a job originally targeted for billing during a period from when the non-billing mode was turned on to when the non-billing mode was turned off. In the case of the present exemplary embodiment, the number of pages printed with non-billing during non-billing mode 805 is the number of pages obtained by performing copy and print during the non-billing mode. The number of printed pages obtained by performing report and image quality adjustment print, which are originally targeted for non-billing, and the number of pages obtained by performing FAX, which is targeted for billing even in the non-billing mode, are not included.

The cumulative number of pages printed with non-billing 806 is a cumulative value of the number of pages printed with non-billing in a job originally targeted for billing from the start of use of the image forming apparatus 102. For example, the cumulative number of pages printed with non-billing 806 in the history No. 2 illustrated in FIG. 7 is obtained by adding together the cumulative number of pages printed with non-billing 806 in the history No. 1 and the number of pages printed with non-billing during non-billing mode 805 in the history No. 2.

The non-billing mode usage history 801 can be displayed on the panel unit 301 of the image forming apparatus 102 or can be output as a report such that it is viewable by the service engineer. At the end of maintenance, the service engineer can print the non-billing mode usage history 801 as a report or record information displayed on the panel unit 301, thus leaving information about the date and time of end of maintenance and the cumulative number of pages printed with non-billing with use of the non-billing ode. At the start of next maintenance, the service engineer can print or display the non-billing mode usage history 801 again, and can thus check whether the non-billing mode has been improperly used by the user.

For example, a scenario example for detecting improper use by the user is described with reference to FIG. 8 using the usage history illustrated in FIG. 7 as an example. Non-billing mode usage histories 1101 (1101A to 1101C) illustrated in FIG. 8 correspond to the non-billing mode usage history illustrated in FIG. 7. The non-billing mode usage history 1101 to be stored includes history No. 1102, non-billing mode ON date and time 1103, non-billing mode OFF date and time 1104, number of pages printed with non-billing during non-billing mode 1105, and cumulative number of pages printed with non-billing 1106. In the non-billing mode usage history 1101C illustrated in FIG. 8, history No. 1, history No. 2, and history No. 5 are assumed to be histories obtained when the service engineer performed maintenance, and history No. 3 and history No. 4 are assumed to be histories obtained when the user performed improper use, i.e., suspicious printing.

At the time of end of maintenance in history No. 1, the service engineer performs outputting of the non-billing mode usage history as a report. The report to be output can be automatically output at the time end of maintenance. At this time, only history No. 1 is recorded in the non-billing mode usage history.

Next, during the service engineer's visit for the second maintenance, when performing outputting or displaying of the non-billing mode usage history as a report, since the current non-billing mode usage history is consistent with the last output non-billing mode usage history, the service engineer understands that there was no improper use. When, after confirming that there was no improper use, the service engineer performs maintenance, history No. 2 is recorded in the non-billing mode usage history. At the time of end of maintenance in history No. 2, the service engineer performs outputting of the non-billing mode usage history as a report as in history No. 1. At this time, only history No. 1 and history No. 2 are recorded in the non-billing mode usage history output as a report, as indicated in the non-billing mode usage history 1101A it in FIG. 8.

After that, during the service engineer's visit for the third maintenance, the service engineer performs outputting or displaying of the non-billing mode usage history as a report. Then, as indicated in the non-billing mode usage history 1101B illustrated in FIG. 8, history No. 3 and history No. 4, which were not present in the last output non-billing mode usage history, are existent, and, since the current non-billing mode usage history is inconsistent with the last output non-billing mode usage history, the service engineer understands that there was improper use, i.e., suspicious printing. Since history No. 3 and history No. 4 reveal that a total of 30 pages were output, the service engineer understands that 30 pages were improperly printed by the user. Since the non-billing mode ON date and time 1103 and the non-billing mode OFF date and time 1104 were also recorded, the service engineer can also recognize when improper use was performed.

<System Configuration of Printer Engine>

Figure 9:
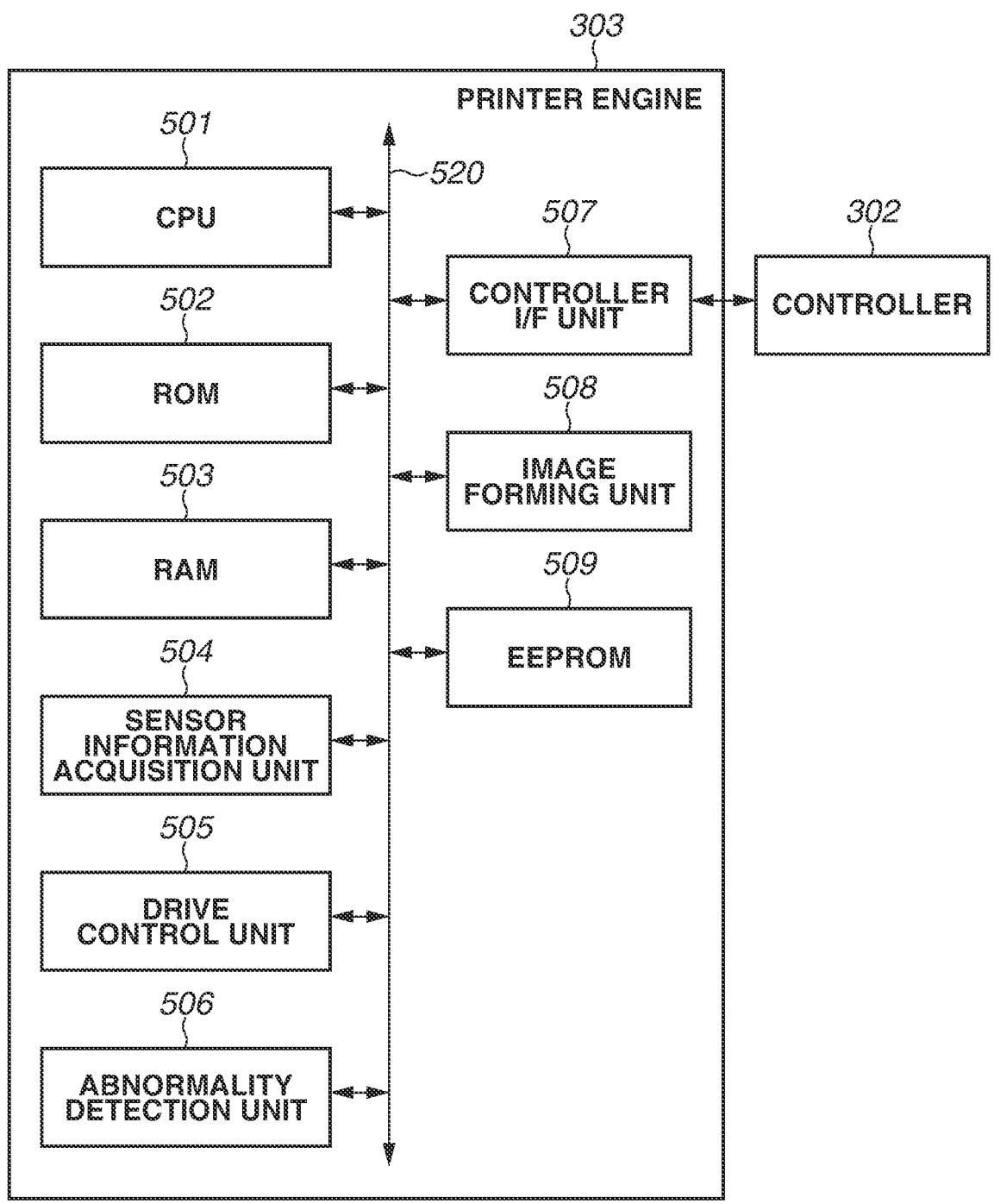
FIG. 9 is a block diagram illustrating a configuration example of a printer engine included in the image forming apparatus.

FIG. 9 is a block diagram illustrating a configuration example of the printer engine 303.

Referring to FIG. 9, the printer engine 303 is configured to include at least devices and control units 501 to 506.

The printer engine 303 includes a ROM 502 and a RAM 503 as storage devices. The ROM 502 retains control program code which the printer engine 303 executes. A sensor information acquisition unit 504 acquires, with various sensors, the presence or absence of paper, the presence or absence of toner, and environmental information, such as the temperature or humidity inside the image forming apparatus 102. A drive control unit 505 drives various motors for performing predetermined image forming processing. An abnormality detection unit 506 detects abnormalities, such as cover opening and paper jam, of the image forming apparatus 102. A controller I/F unit 507 performs communication with the controller 302 based on a predetermined communication protocol.

A CPU 501 transmits status information, for example, acquired or detected by the sensor information acquisition unit 504 or the abnormality detection unit 506 to the controller 302 via the controller I/F unit 507. The CPU 501 receives an instruction command from the controller 302 via the controller I/F unit 507, and transmits the content of the instruction command to the related devices. An image forming unit 508 performs predetermined image forming processing (for example, a series of processing operations such as electric charging, exposure, developing, transfer, and fixing in an electrophotographic technique) on bit-mapped image information transmitted from the controller 302 via the controller I/F unit 507.

A non-volatile memory 509 retains device information about the image forming apparatus 102. The non-volatile memory 509 can be any memory as long as it is a flash memory, and is assumed to be an EEPROM in the present exemplary embodiment. A CPU bus 520 includes an address bus, a data bus, and a control bus. Each device can access all of the devices connected to the CPU bus 520.

<Processing Related to Generation and Use of Non-billing Mode Usage History>

Figure 10:
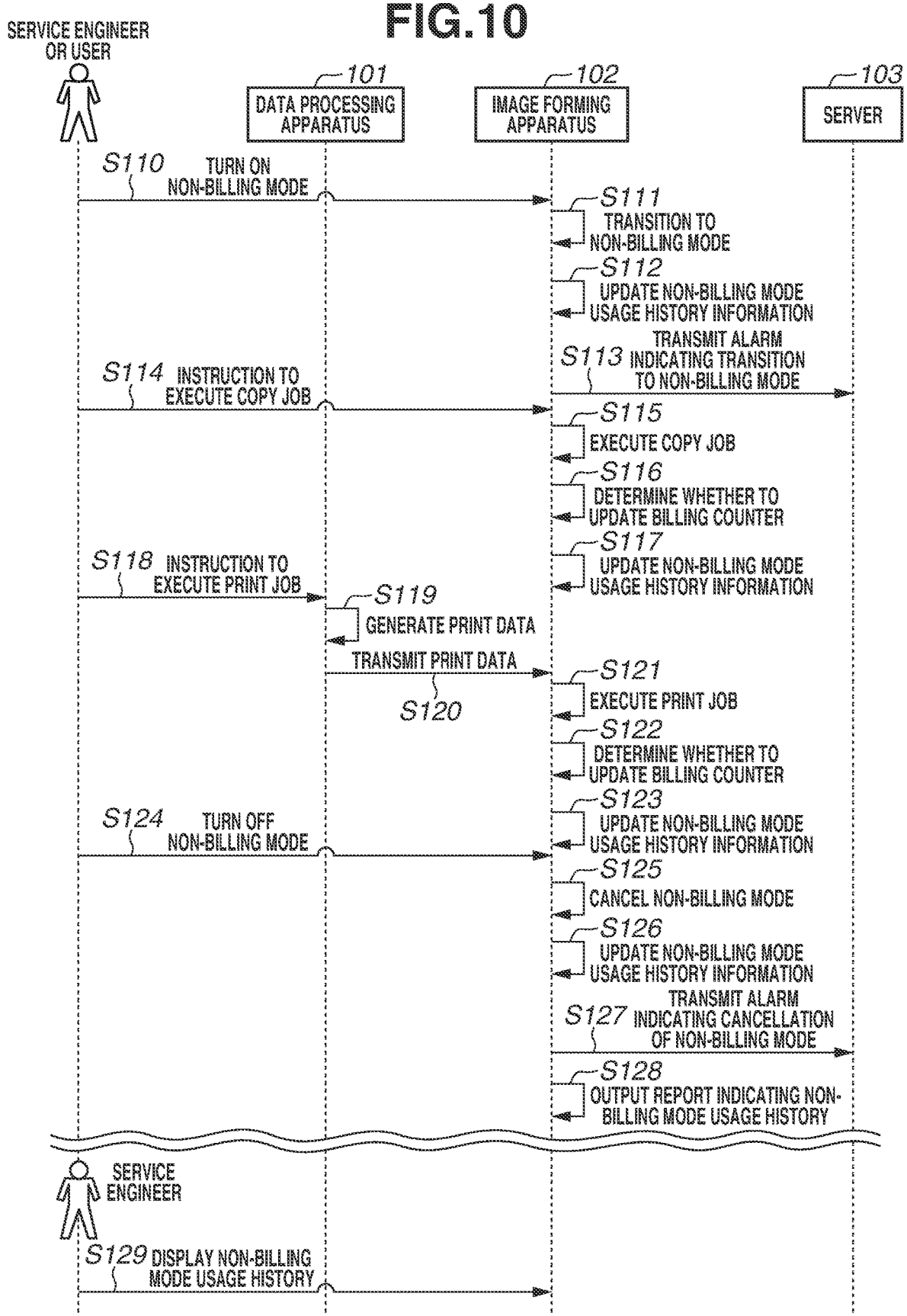
FIG. 10 is a sequence diagram used to explain processing related to generation and usage of the non-billing mode usage history in the first exemplary embodiment.

FIG. 10 is a sequence diagram illustrating the respective processing operations of the data processing apparatus 101, the controller 302 included in the image forming apparatus 102, and the server 103 related to generation and use of the non-billing mode usage history.

A program that runs on the image forming apparatus 102 according to this sequence diagram is stored in, for example, the ROM 404 included in the controller 302 illustrated in FIG. 4, and is then read out to the RAM 405 and executed by the CPU 409.

In step S110, to perform maintenance, the service engineer performs an operation to turn on the non-billing mode by performing a specific procedural operation via the panel unit 301 and selecting the non-billing mode ON radio button 902 and pressing the OK button 904 in the UI such as that illustrated in FIG. 3. In step S111, the CPU 409 included in the controller 302 detects inputting of an instruction to turn on the non-billing mode via the panel I/F unit 401, changes billing mode information stored in the RAM 405 to the non-billing mode, and transitions to the non-billing mode. At this timing, non-billing mode usage history information about a new history No. (for example, history No. 2: information 822 illustrated in FIG. 7) is generated.

In step S112, the CPU 409 acquires current time-of-day information from the time-of-day information management unit 414, and stores the non-billing mode ON date and time 803 illustrated in FIG. 7 as history information about the non-billing mode usage history 801 (here, history information about history No. 2: information 823 illustrated in FIG. 7) in the EEPROM 410. In step S113, the CPU 409 transmits alarm information indicating that the image forming apparatus 102 has transitioned to the non-billing mode to the server 103 via the server I/F unit 416. With this, information indicating that the image forming apparatus 102 has transitioned to the non-billing mode is recorded on the server 103 so that another service engineer who can view information recorded on the server 103 knows that the non-billing mode is being used.

When arranging a visit to perform maintenance, the service engineer can input date and time of the visit to the server 103. With such a configuration employed, when an alarm notification indicating that the image forming apparatus has transitioned to the non-billing mode has been received, date and time of a visit to be performed by the service engineer can be checked. If date and time of a visit to be performed by the service engineer is checked and there is no inputting of the date and time of a visit performed by the service engineer, it is found that the image forming apparatus is operating in the non-billing mode regardless of the fact that there is no inputting of the date and time of a visit performed by the service engineer, so that the possibility of improper use by the user can be detected.

Next, in step S114, the service engineer operates the panel unit 301 to issue an execution instruction for a copy job. The CPU 409 included in the controller 302 detects the issuance of the copy job execution instruction via the panel I/F unit 401. In step S115, the CPU 409 executes a copy job by controlling the DMA control unit 407, the rendering unit 408, and the job control unit 412 based on the image data read by a scan device (not illustrated) and the execution instruction. In step S116, the CPU 409 refers to the billing management table 701 and determines whether to set printed pages as a billing target. The copy job, the billing target information 703 of which is "billing" and the non-billing mode target information 704 of which is "target", is set as a job with non-billing during the non-billing mode.

Since the copy job is a count target job as the number of pages printed with non-billing during non-billing mode 805 (FIG. 7), the number of printed pages is added to a counter provided in the RAM 405. The counter provided in the RAM 405 is referred to as a "job page counter". The number of printed pages is also added to the cumulative page counter 614 for a copy job corresponding to the non-billing mode. In step S117, at the time of completion of the copy job, the CPU 409 stores and updates the job page counter value as the number of pages printed with non-billing during non-billing mode 805. Specifically, for example, if the number of pages printed in the copy job is 100, the CPU 409 stores a value of 100 as the number of pages 805.

Next, in step S118, the service engineer issues a print job execution instruction via the data processing apparatus 101. In step S119, the data processing apparatus 101 generates print data based on the print job execution instruction, and, in step S120, the data processing apparatus 101 transmits the print data to the image forming apparatus 102. The CPU 409 included in the controller 302 of the image forming apparatus 102 detects the issuance of the print job execution instruction the host I/F unit 402. In step S121, the CPU 409 converts print data received by the intermediate data generation unit 403 and executes a print job by controlling the DMA control unit 407, the rendering unit 408, and the job control unit 412 based on the print job execution instruction.

In step S122, the CPU 409 refers to the billing management table 701, and determines whether to set printed pages as a billing target. The print job, the billing target information 703 of which is "billing" and the non-billing mode target information 704 of which is "target", is set as a job with non-billing during the non-billing mode. Since the print job is a count target job as the number of pages printed with non-billing during non-billing mode 805, the number of printed pages is added to the job page counter. The number of printed pages is also added to the cumulative page counter 624.

In step S123, at the time of completion of the print job, the CPU 409 stores and updates the job page counter value as the number of pages printed with non-billing during non-billing mode 805. Specifically, if the number of pages printed in the print job is 50, the CPU 409 stores a value of 150, which is obtained by adding 50 to a value of 100 obtained at the time of completion of the copy job, as the number of pages 805 (information 825 in FIG. 7).

In step S124, upon completion of maintenance, the service engineer performs an operation to turn off the non-billing mode by performing a specific procedural operation via the panel unit 301 and selecting the non-billing mode OFF radio button 903 and pressing the OK button 904 in the UI such as that illustrated in FIG. 3. In step S125, the CPU 409 included in the controller 302 detects inputting of an instruction to turn off the non-billing mode via the panel I/F unit 401, changes billing mode information stored in the RAM 405 to the normal mode, and transitions to the normal mode, i.e., cancels the non-billing mode. In step S126, the CPU 409 acquires current time-of-day information from the time-of-day information management unit 414, and stores the non-billing mode OFF date and time 804 illustrated in FIG. 7 as history information about the non-billing mode usage history 801 (here, history information about history No. 2: information 824 illustrated in FIG. 7) in the EEPROM 410. In this way, the CPU 409 stores a history from turning-on to turning-off of the non-billing mode as one record (history No.) of history information.

The CPU 409 reads out the cumulative number of pages printed with non-billing 806 (a value of 30 in information 816 illustrated in FIG. 7) in the previous record, specifically, the previous history from turning-on to turning-off of the non-billing mode (here, history No. 1). Then, the CPU 409 adds together the read-out cumulative number of pages printed with non-billing 806 and the number of pages printed with non-billing during non-billing mode 805 updated in step S123 (here, a value of 150 in information 825 illustrated in FIG. 7) in the RAM 405. In step S126, the CPU 409 stores the value obtained by addition as the cumulative number of pages printed with non-billing 806 in the history being currently updated (here, a value of 180 in information 826 illustrated. FIG. 7), thus updating the cumulative number of pages printed with non-billing 806. After completion of updating, the CPU 409 clears the job page counter. In this way, the job page counter is reset for every record, i.e., for every history.

In step S127, the CPU 409 transmits alarm information indicating that the image forming apparatus 102 has canceled the non-billing mode to the server 103 via the server I/F unit 416. With this, information indicating that the non-billing mode of the image forming apparatus 102 has been canceled is recorded on the server 103, so that another service engineer who can view information recorded on the server 103 knows that the image forming apparatus 102 is not in the non-billing mode.

In step S128, the CPU 409 automatically outputs a report using the DMA control unit 407, the rendering unit 408, and the job control unit 412 based on the non-billing mode usage history information managed by the history information management unit 415. With this, the service engineer can store the non-billing mode usage history obtained at the time of end of maintenance, and, at the time of start of next maintenance, can use the stored non-billing mode usage history to check whether there was improper use by the user.

Performing processing in the above-described way enables storing and managing history information leading from turning-on of the non-billing mode to turning-off thereof as one history (record). Since processing for storing history information is performed in a similar way even if the operator is not a service engineer but a user, even in a case where the user has improperly used the non-billing mode, it is possible to leave history information.

While, in the present exemplary embodiment, an example in which the non-billing mode usage history 801 is automatically printed as a report in step S128 is described, the non-billing mode usage history 801 does not need to be automatically output. In that case, it is also recommended that, after canceling the non-billing mode in step S125, the service engineer display or print the non-billing mode usage history 801 and record the non-billing mode ON date and time 803, the non-billing mode OFF date and time 804, and the cumulative number of pages printed with non-billing 806.

In doing so, in step S129, at the time of start of next maintenance, the service engineer can check whether the cumulative number of pages printed with non-billing 806 has changed by printing or displaying the non-billing mode usage history 801 again. If it is found that the cumulative number of pages printed with non-billing 806 has changed, the service engineer compares it with the last recorded non-billing mode usage history, and can thus understand when improper use by the user was performed and how many pages were printed with non-billing.

As described above, in the present exemplary embodiment, the image forming apparatus is provided with a non-billing mode execution unit (701, 704, S115, and S121) for causing a job targeted for billing to be executed with non-billing. The image forming apparatus is provided with a switching unit (901, S111, and S125) for issuing an instruction to switch between enablement and disablement (turning-on/turning-off or transition/cancellation) of the non-billing mode of the non-billing mode execution unit. The image forming apparatus is provided with a non-billing mode execution history storage unit (413, 415, S112, S117, S123, and S126) for storing a non-billing mode execution history (801) including date and time information (803) indicating when the non-billing mode was switched from disablement (OFF) to enablement (ON). With this, in a case where printing originally targeted for billing was improperly performed with non-billing during the absence of a service engineer, a history including date and time information indicating when the non-billing mode was changed from disablement to enablement is left, so that the service engineer can understand that improper printing was performed.

The non-billing mode execution unit is configured to store, as a non-billing mode execution history, not only the date and time information indicating when the non-billing mode was changed from disablement to enablement, but also the number of pages printed with non-billing during non-billing mode (805), for each job. In this way, since the number of improperly printed pages is also stored as a history, it becomes possible to perform appropriate billing on the user.

In the first exemplary embodiment, an example has been described in which a copy job and a print job are not distinguished from each other and are added together to perform increasing of count and updating of a counter as the number of pages printed with non-billing during non-billing mode.

In a second exemplary embodiment, a distinction is made between job types, and, in each job type, an individual history is left as the number of pages printed with non-billing during non-billing mode. Specifically, in the present exemplary embodiment, the history information management unit 415 is configured to leave a history using a non-billing mode usage history 1001 illustrated as an example in FIG. 11, instead of the non-billing mode usage history 801 in the first exemplary embodiment. The other configurations of the present exemplary embodiment are substantially similar to those of the first exemplary embodiment.

History No. 1002, non-billing mode ON date and time 1003, and non-billing mode OFF date and time 1004 in the non-billing mode usage history 1001 are the same as history No. 802, non-billing mode ON date and time 803, and non-billing mode OFF date and time 804 illustrated in FIG. 7, respectively, and are, therefore, omitted from description herein.

Job type 1005 indicates the type of a job printed with non-billing during non-billing mode. In the case of the present exemplary embodiment, the job type 1005 is either a copy or print job. In a case where both copy and print have been executed in the same non-billing mode, as indicated as an example in, for example, history No. 2 and history No. 3 illustrated in FIG. 11, their jobs are recorded as individual histories (records) for the respective job types.

The number of pages printed with non-billing during non-billing mode 1006 indicates the number of pages of the same job type printed with non-billing during a period from turning-on of the non-billing mode to turning-off thereof. Since jobs with different job types are recorded as individual histories (records), in the present exemplary embodiment, the number of pages 1006 is the number of printed pages obtained by either the copy or the print, and does not include the number of printed pages in the other jobs.

The cumulative number of pages printed with non-billing 1007 is a cumulative value of the number of pages printed with non-billing from the time of start of use of the image forming apparatus. For example, the cumulative number of pages printed with non-billing 1007 indicated in the history No. 2 illustrated in FIG. 11 (here, a value of 130) is the sum of the cumulative number of pages printed with non-billing 1007 in the history No. 1 (here, a value of 30) and the number of pages printed with non-billing 1006 in the history No. 2 (here, a value of 100)

In the present exemplary embodiment, as illustrated in FIG. 11, the cumulative number of pages printed with non-billing 1007 is configured to indicate the number of pages obtained by sequentially adding together the numbers of printed pages caused by copy jobs and print jobs. The cumulative number of pages can be individually displayed for each job type such as the cumulative number of pages obtained by sequentially adding together the numbers of printed pages caused by only copy jobs and the cumulative number of pages obtained by sequentially adding together the numbers of printed pages caused by only print jobs. The cumulative number of pages caused by only copy jobs and the cumulative number of pages caused by only print jobs can be displayed with use of the cumulative page counters 614 and 624 illustrated in FIG. 5, respectively.

Next, in the present exemplary embodiment, processing different from that in the first exemplary embodiment is described with reference to the sequence diagram of FIG. 10 in the first exemplary embodiment.

Processing in steps S110 to S115 is the same as that in the first exemplary embodiment, and is, therefore, omitted from description herein.

At the time of start of execution of a copy job in step S115 after turning-on of the non-billing mode in step S110, the history No. generated in step S111 (for example, history No. 2 in FIG. 11) becomes non-billing mode usage history information for a copy job. While, in step S116, the number of pages printed in the copy job needs to be added in the RAM 405, such addition is performed using a counter (hereinafter referred to as a "copy job number-of-pages counter") different from that for a print job.

The cumulative page counter 614 for copy job corresponding to the non-billing mode (FIG. 5) also performs addition as much as the number of pages printed in the copy job. At the time of completion of the copy job, in step S117, the CPU 409 stores a copy job number-of-pages counter value (here, a value of 100) as the number of pages printed with non-billing during non-billing mode 1006, thus updating the non-billing mode usage history information.

Next, while the non-billing mode is kept turned on, at the time of start of execution of a print job in step S118 in response to a print job execution instruction, the CPU 409 generates non-billing mode usage history information for print job with a new history No. (here, history No. 3 in FIG. 11). After that, processing in steps S119 to S121 is the same as that in the first exemplary embodiment, and is, therefore, omitted from description herein. While, in step S122, the number of pages printed in the print job needs to be added in the RAM 405, such addition is performed using a counter (hereinafter referred to as a "print job number-of-pages counter") different from that for a copy job.

The cumulative page counter 624 for print job corresponding to the non-billing mode (FIG. 5) also performs addition as much as the number of pages printed in the print job. In step S123, the CPU 409 stores a print job number-of-pages counter value (here, a value of 50) as the number of pages printed with non-billing during non-billing mode 1006 in history No. for print job generated in step S118 (here, history No. 3), thus updating the non-billing mode usage history information. Processing in steps S124 to S125 is the same as that in the first exemplary embodiment, and is, therefore, omitted from description herein.

In step S126, the CPU 409 reads out the cumulative number of pages printed with non-billing 1007 (here, a value of 30) in the previous history No. (here, history No. 1) of the non-billing mode usage history for copy job. The CPU 409 adds together the read-out cumulative number of pages 1007 and the number of pages printed with non-billing during non-billing mode 1006 updated in step S117 (here, a value of 100) in the RAM 405. In step S126, the CPU 409 stores the value obtained by addition (here, a value of 130) as the cumulative number of pages printed with non-billing 1007 in the non-billing mode usage history No. for copy job (here, history No. 2), thus updating the non-billing mode usage history information.

The CPU 409 also updates the cumulative number of pages printed with non-billing 1007 in the print job history No. (here, history No. 3) in a similar way. Specifically, the CPU 409 adds together the cumulative number of pages printed with non-billing 1007 in the previous history (here, history No. 2) (here, a value of 130) and the number of pages printed with non-billing during non-billing mode 1006 updated in step S123 (here, a value of 50). In step S126, the CPU 409 stores the value obtained by addition (here, a value of 180) as the cumulative number of pages printed with non-billing 1007 in the non-billing mode usage history No. for print job (here, history No. 3), thus updating the non-billing mode usage history information.

After completion of updating, the CPU 409 clears the copy job number-of-pages counter and the print job number-of-pages counter. In this way, the copy job number-of-pages counter and the print job number-of-pages counter are reset for every corresponding job history (record).

The cumulative number of pages 1007 can be configured such that the cumulative numbers of pages are individually stored for a copy job and a print job.

Processing in steps S127 to S128 is the same as that in the first exemplary embodiment, and is, therefore, omitted from description herein.

As described above, the second exemplary embodiment attains an advantageous effect similar to that of the first exemplary embodiment and enables understanding of how many pages were printed for each job type during a period from turning-on of the non-billing mode to turning-off of the non-billing mode.

In the above-described exemplary embodiments, in a case where the number of pages printed with non-billing during non-billing mode has exceeded a predetermined number, the CPU 409 can determine that the performed printing is improper printing and can turn off the non-billing mode. The CPU 409 can notify the server 103 of that effect and can hide the non-billing mode setting dialog 901.

In a case where date and time when the non-billing mode has been switched from turning-off to turning-on, recorded as date and time information, is outside a predetermined period previously set by, for example, the user (in other words, is in a period in which the non-billing mode should be set to turning-off), the CPU 409 can determine that such switching is improper. In that case, the CPU 409 can turn off the non-billing mode, and notify the server 103 of that effect and hide the non-billing mode setting dialog 901.

The present disclosure can be applied to, for example, other types of image forming apparatuses and digital multifunction peripherals as long as they are configured in such a way as to attain functions similar to those of the image forming apparatus in the above-described exemplary embodiments.

OTHER EMBODIMENTS

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random access memory (RAM), a read-only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2017-222689 filed Nov. 20, 2017, which is hereby incorporated by reference herein in its entirety.

What is claimed is:

1. An image forming apparatus usable for billing contract for billing based on a number of formed images, the image forming apparatus comprising:
   an image forming device configured to form an image on a sheet;
   one or more controllers configured to function as:
   a unit configured to enable one of a plurality of modes including a first mode for causing the image forming device to form an image and updating a billing counting value and a second mode for causing the image forming device to form an image and updating a non-billing counting value;
   a unit configured to store log information of one period that is from a start to an end of the second mode in one record, wherein the log information at least includes information that indicates an amount of updating the non-billing counting value in the one period; and
   a unit configure to output list information including a plurality of records corresponding to a plurality of periods at least including the one period, wherein the plurality of records in the list are arranged in time series.

2. The image forming apparatus according to claim 1, wherein the one record includes information about a date and time of starting the one period and information about a date and time of ending the one period.

3. The image forming apparatus according to claim 1, wherein the controller stores a number of pages as an individual history for each type of image forming in the storage unit.

4. The image forming apparatus according to claim 1, wherein the controller stores a cumulative number of pages printed in the second mode in the storage unit.

5. The image forming apparatus according to claim 1, wherein the controller stores a cumulative number of pages printed in the second mode as an individual history for each type of image forming in the storage unit.

6. The image forming apparatus according to claim 1, wherein the controller is configured to further function as:
   a unit configured to receive an instruction to switch between the second mode and another mode; and
   a unit configured to, when switching between the second mode and the other mode has been performed, notify an external device of the switching.

7. The image forming apparatus according to claim 6, wherein the controller is configured to further function as:
   a unit configured to, in a case where date and time when switching of the modes from the other mode to the second mode was performed by the switching is outside a predetermined period, determine that the performed switching is improper.

8. The image forming apparatus according to claim 1, wherein the controller is configured to further function as a unit configured to enable referring to an execution history of the second mode.

9. The image forming apparatus according to claim 1, wherein the controller is configured to further function as a unit configured to, in a case where a number of pages obtained by printing performed in the second mode exceeds a predetermined number, determine that the performed printing is improper.

10. The image forming apparatus according to claim 1, further comprising:
a display device configured to display information,
wherein the information is output to cause the display device to display the information including the amount of updating the non-billing counting value information.

11. The image forming apparatus according to claim 1, wherein the information is output to cause the image forming device to form an image of a report including the amount of updating the non-billing counting value information.

12. The image forming apparatus according to claim 1, wherein the updating of the non-billing counting value is counting up of a count number.

13. A control method for an image forming apparatus including an image forming device configured to form an image on a sheet, the control method comprising:
enabling one of a plurality of modes including a first mode for causing the image forming device to form an image and updating a billing counting value and a second mode for causing the image forming device to form an image and updating a non-billing counting value;
storing log information of one period that is from a start to an end of the second mode in one record, wherein the log information at least includes information that indicates an amount of updating the non-billing counting value in the one period; and
outputting list information including a plurality of records corresponding to a plurality of periods at least including the one period, wherein the plurality of records in the list are arranged in time series.

14. The control method according to claim 13, further comprising storing, in a storage unit, information about a date and time of starting the second mode and information about a date and time of ending the second mode, a number of pages as an individual history for each type of image, a cumulative number of pages printed in the second mode, or a cumulative number of pages printed in the second mode as an individual history for each type of image forming.

15. The control method according to claim 13, further comprising:
receiving an instruction to switch between the second mode and another mode; and
when switching between the second mode and the other mode has been performed, notifying an external device of the switching.

16. The control method according to claim 15, further comprising determining that the performed switching is improper, in a case where date and time when switching of the modes from the other mode to the second mode was performed by the switching is outside a predetermined period.

17. The control method according to claim 13, further comprising enabling referring to an execution history of the second mode.

18. The control method according to claim 13, further comprising determining that the performed printing is improper, in a case where a number of pages obtained by printing performed in the second mode exceeds a predetermined number.

19. An image forming apparatus usable for billing contract for billing based on a number of formed images, the image forming apparatus comprising:
an image forming device configured to form an image on a sheet;
one or more controllers configured to function as:
a unit configured to set, to an operation mode, one of a plurality of modes including a first mode for causing the image forming device to form an image of a predetermined type and updating a billing counting value and a second mode for causing the image forming device to form the image of the predetermined type and updating a non-billing counting value;
a unit configured to store log information of one period that is from a start to an end of the second mode in one record, wherein the log information at least includes information that indicates an amount of updating the non-billing counting value in the one period; and
a unit configured to output list information including a plurality of records corresponding to a plurality of periods at least including the one period, wherein the plurality of records in the list are arranged in time series.

* * * * *